United States Patent
Liu et al.

(10) Patent No.: US 11,853,629 B1
(45) Date of Patent: Dec. 26, 2023

(54) SYSTEM AND METHOD FOR FEED FORWARD CONTROL OF PRINTHEAD TEMPERATURE IN AN INKJET PRINTER TO IMPROVE INK IMAGE QUALITY

(71) Applicant: Xerox Corporation, Norwalk, CT (US)

(72) Inventors: Chu-Heng Liu, Penfield, NY (US); Jason M. LeFevre, Penfield, NY (US); Seemit Praharaj, Webster, NY (US); Jorge A. Alvarez, Webster, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/050,267

(22) Filed: Oct. 27, 2022

(51) Int. Cl.
   *H04N 1/034* (2006.01)
   *G06F 3/12* (2006.01)
   *B41J 2/045* (2006.01)

(52) U.S. Cl.
   CPC .......... *G06F 3/126* (2013.01); *B41J 2/04563* (2013.01); *G06F 3/1215* (2013.01)

(58) Field of Classification Search
   CPC .. H04N 1/2346; H04N 1/2369; H04N 1/6091; H04N 1/034; B41J 2/04563; B41J 2/04515
   USPC ....... 358/1.15, 1.9, 502, 503, 1.14; 347/189, 347/194, 20; 399/44, 94
   See application file for complete search history.

(56) References Cited

U.S. PATENT DOCUMENTS

| | | | |
|---|---|---|---|
| 5,838,356 A | 11/1998 | Gunther et al. | |
| 6,802,585 B1 | 10/2004 | Wratchford | |
| 9,108,448 B1 | 8/2015 | Bergstedt et al. | |
| 2003/0035030 A1* | 2/2003 | Hamamoto | B41J 2/04553 347/57 |
| 2006/0203027 A1* | 9/2006 | Espasa | B41J 2/0458 347/17 |
| 2007/0120884 A1 | 5/2007 | Lecheheb | |
| 2011/0085003 A1 | 4/2011 | Oonuki et al. | |
| 2015/0266238 A1 | 9/2015 | Ederer et al. | |
| 2017/0274647 A1 | 9/2017 | Aoki et al. | |
| 2018/0326750 A1 | 11/2018 | Hachmann et al. | |
| 2019/0314847 A1 | 10/2019 | Fritz et al. | |
| 2020/0101724 A1 | 4/2020 | Kobayashi et al. | |
| 2021/0197555 A1 | 7/2021 | Fukasawa et al. | |

* cited by examiner

*Primary Examiner* — Jamares Q Washington
(74) *Attorney, Agent, or Firm* — Maginot Moore & Beck LLP (57) ABSTRACT

A method of operating an inkjet printer identifies a thermal load that will be imposed on the printheads in the inkjet printer during execution of a print job and identifies a remedial action to reduce the thermal load if the thermal load increases the temperature of the printheads above an upper threshold of a predetermined temperature range. The thermal load is identified from the ink image content data for the print job, the print job parameters for the print job, and environmental condition measurements received from sensors in the printer. The remedial actions include manipulation of the print job queue, alteration of print job parameters, and active cooling to remove heat from the printheads or media within the printer.

14 Claims, 6 Drawing Sheets

| Low AC. 20Kp run: Target 5MJ's/Kp/head or less | | | | |
| --- | --- | --- | --- | --- |
| | Average: Mj's/Kp/head | | | |
| | Black | Cyan | Magenta | Yellow |
| 40kHz, 37°C | 3.0 | 9.0 | 9.0 | 49.0 |
| 40kHz, 32°C | 2.0 | 5.0 | 1.0 | 12.0 |

Low Area Coverage missing jet performance better at 32°C

SYSTEM AND METHOD FOR FEED FORWARD CONTROL OF PRINTHEAD TEMPERATURE IN AN INKJET PRINTER TO IMPROVE INK IMAGE QUALITY

TECHNICAL FIELD

This disclosure relates generally to devices that produce ink images on media, and more particularly, to the regulation of printhead temperatures in such devices during printing.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the regulation of printhead temperatures during print jobs. The temperature of a printhead can reach a level that adversely impacts the properties and stability of some inks. Printhead temperatures can quickly climb when duplex print jobs are being printed because drying the printed side of the media before it returns to the print zone for the printing of the second side can increase both the temperature of the media and the ambient temperature within the printer. This issue can be exacerbated when duplex print jobs use heavy stock media because this type of media does not sufficiently dissipate heat before it returns to the print zone for the printing of the second side. As used in this document, the term "heavy stock media" means media having a mass of at least 200 grams per square meter (gsm). Being able to regulate printhead temperatures so they remain within a range conducive for ink stability and retain the ink's desired properties during ink image printing would be beneficial.

SUMMARY

A color inkjet printer is configured to regulate printhead temperatures so they remain within a range conducive for ink stability and retain the ink's desired properties during ink image printing. The color inkjet printer includes at least one printhead, and a controller operatively connected to the at least one printhead and a print job queue. The controller is configured to identify a thermal load on the at least one printhead that will occur during execution of a print job in the print job queue using print job parameters for the print job, ink image content data for the print job, and environmental condition measurements received from sensors in the printer, determine whether the identified thermal load will raise a temperature of the at least one printhead above an upper threshold of a predetermined temperature range, and identify a remedial action that reduces the identified thermal load so execution of the print job will not raise the temperature of the at least one printhead above the upper threshold of the predetermined temperature range.

A method of operating a color inkjet printer regulates printhead temperatures so they remain within a range conducive for ink stability and retain the ink's desired properties during ink image printing. The method of operating the color inkjet printer includes identifying a thermal load on at least one printhead prior to execution of a print job in a print job queue, the thermal load being identified by using print job parameters for the print job, ink image content data for the print job, and environmental condition measurements in the printer, determining whether the identified thermal load raises a temperature of the at least one printhead above an upper threshold of a predetermined temperature range, and identifying a remedial action that reduces the identified thermal load so the temperature of the at least one printhead will not be raised above the upper threshold of the predetermined temperature range when the print job is executed.

BRIEF DESCRIPTION OF THE DRAWINGS

The foregoing aspects and other features of a color inkjet printer and color inkjet printer operational method that regulates printhead temperatures so they remain within a range conducive for ink stability and retain the ink's desired properties during ink image printing are explained in the following description, taken in connection with the accompanying drawings.

DETAILED DESCRIPTION

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below are configured with a printhead cooler and a media cooler and the controller is configured to use a feed forward control loop to operate the printhead cooler and media cooler to regulate printhead temperatures so they remain within a range conducive for ink stability and retain the ink's desired properties during ink image printing. By analyzing the ink image content data and print job parameters of incoming jobs along with environmental condition measurements, printhead thermal loads can be predicted and potential printhead temperature changes identified. Knowledge of these future conditions enables the controller to select an appropriate remedial measure to maintain printhead temperature within an appropriate range for each print job before a print job is executed.

The printer and method can take measures to prevent a hard fault/shut down of the printer arising from printhead temperatures violating the appropriate temperature range for execution of a print job. For example, an operator warning, slowing down of the media speed, pausing of the print job, or active operation of the printhead cooler or media cooler or both coolers can be used to keep the printhead temperature within the appropriate temperature range for the print job. Some printhead coolers and media coolers require time to achieve a thermal state adequate for printhead cooling or media cooling due to the thermal mass of the coolers. By looking forward to the print jobs in the queue, the time for use of the printhead cooler and media cooler can be predicted and the start-up procedure for the printhead cooler and media cooler can be performed beforehand so the printhead cooler and media cooler is ready at the predicted time.

Other measures for regulating printhead temperature include displaying messages to the operator to alter the order of print jobs in the print job queue. For example, a long duplex job can be broken into multiple components and simplex print jobs mixed into the duplex job components. Such management of the print jobs in the print job queue help attenuate the heat conditions to which the printheads in the printer are subjected so the thermal load on the printheads does not exceed the capacity of the printhead temperature regulation system.

Figure 1:
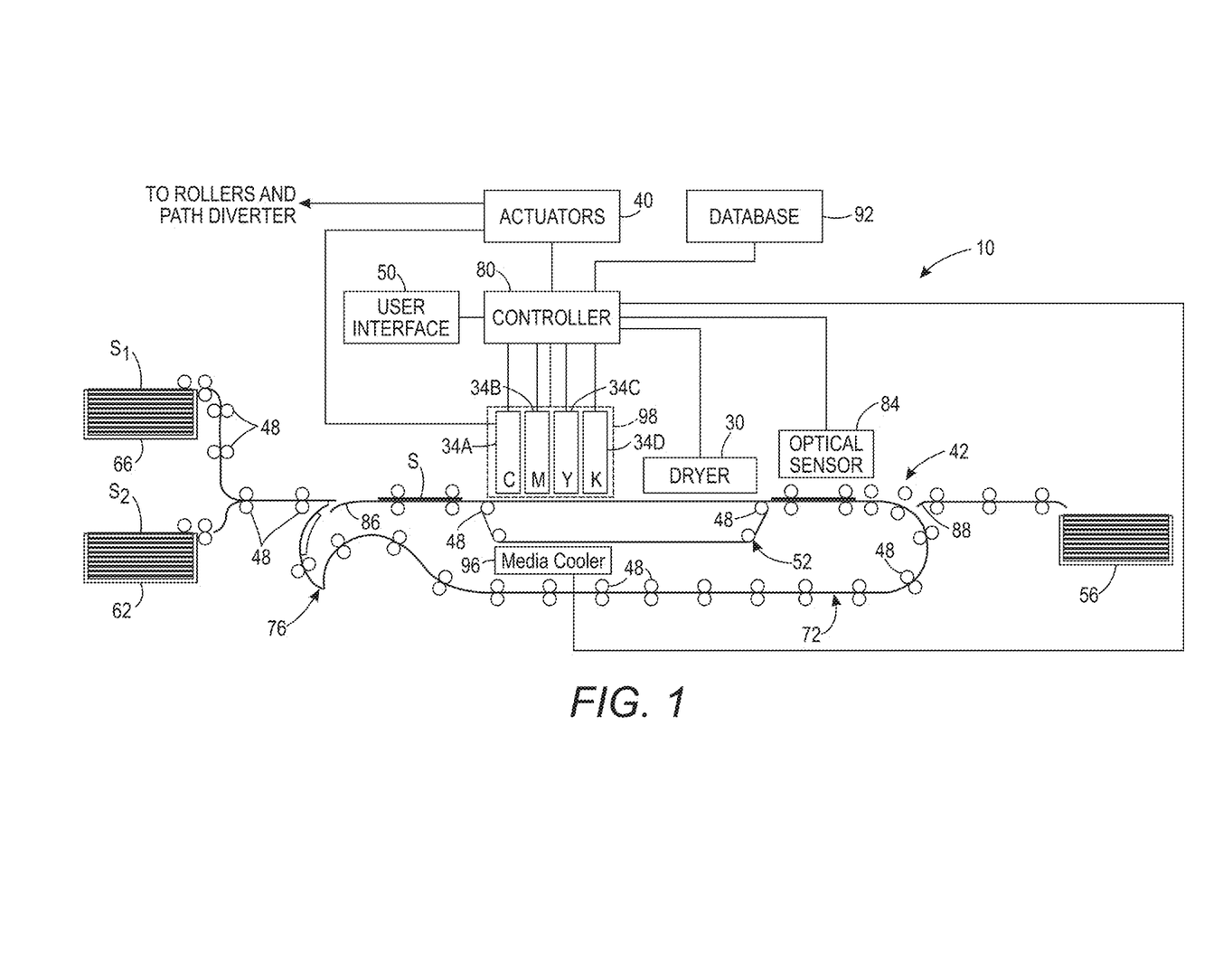
FIG. 1 is a schematic drawing of a color inkjet printer that is configured with a printhead cooler, media cooler, and a feed forward system for regulating printhead temperatures so they remain within a range conducive for ink stability and retain the ink's desired properties during ink image printing.

FIG. 1 depicts a high-speed color inkjet printer 10 that is configured to regulate printhead temperatures so they remain within a range conducive for ink stability and retain the ink's desired properties during ink image printing. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
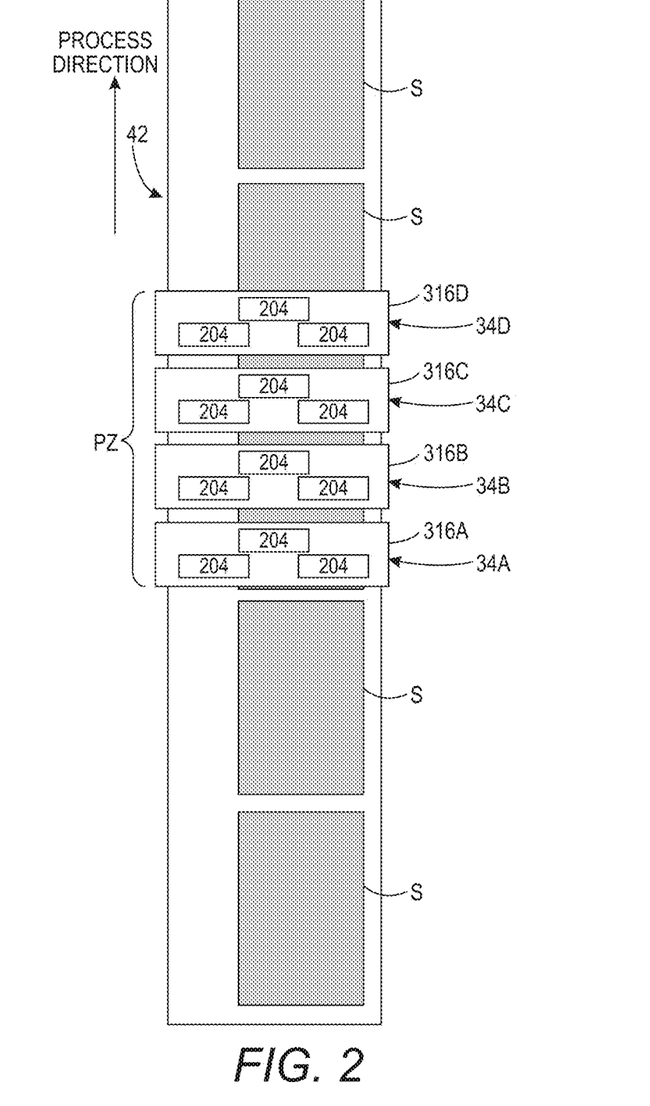
FIG. 2 depicts the print zone in the printer of FIG. 1.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and the ink image fixed to the substrate by the dryer 30. The substrate is moved by the rotation of rollers in a direction that is opposite to the direction of media movement in the print zone past the printheads. At position 76 in the duplex path 72, the substrate can be turned over so it can merge into the media stream being carried by the media transport 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, some of the media sheets in a print job are printed with test pattern images at predetermined intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92, which is operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the media transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the ink image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, the instructions and data stored in the memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

The printer 10 is configured with a media cooler 96 and a printhead cooler 98. Each of these components is operatively connected to the controller 80. These coolers 96 and 98 can include, but are not limited to, components that provided forced air cooling, such as a fan; pneumatic cooling, such as the circulation of water or other heat absorbing liquid; heat sinks or fins; thermoelectric cooling, such as that provided by pettier devices; refrigeration units; and the like. The controller 80 uses the feed forward method described more fully below to Operate and control pint job queue, printer components, the media cooler 96, and the printhead cooler 98 to regulate the temperatures of the printheads in the printhead modules.

In operation, database 92 includes a print job queue into which print jobs are sent. As used in this document, the term "print job" means ink image content data for an ink image to be produced by a printer and the print job parameters at which the printer is operated to produce the ink image. The ink image content data is sent to the controller 80 from either a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for a print job and the term "ink image content data" means digital data that identifies a color and a volume of each ejected ink drop that forms pixels in an ink image to be printed on a media sheet. A print job is not released from the print job queue until the feed forward system predicts the thermal load produced by execution of the print job and determines whether the predicted thermal load will raise the temperature of any printhead in the printer above an upper threshold of a predetermined temperature range. If the thermal load will not cause a printhead temperature to rise above an upper threshold of a predetermined temperature range, then the print job can be released for execution. If the predicted thermal load will raise a printhead temperature above an upper threshold of a predetermined temperature range, then remedial measures are identified before the print job can be released for execution. The identified remedial measures are taken before the print job is executed or they are performed during execution of the print job.

Figure 3:
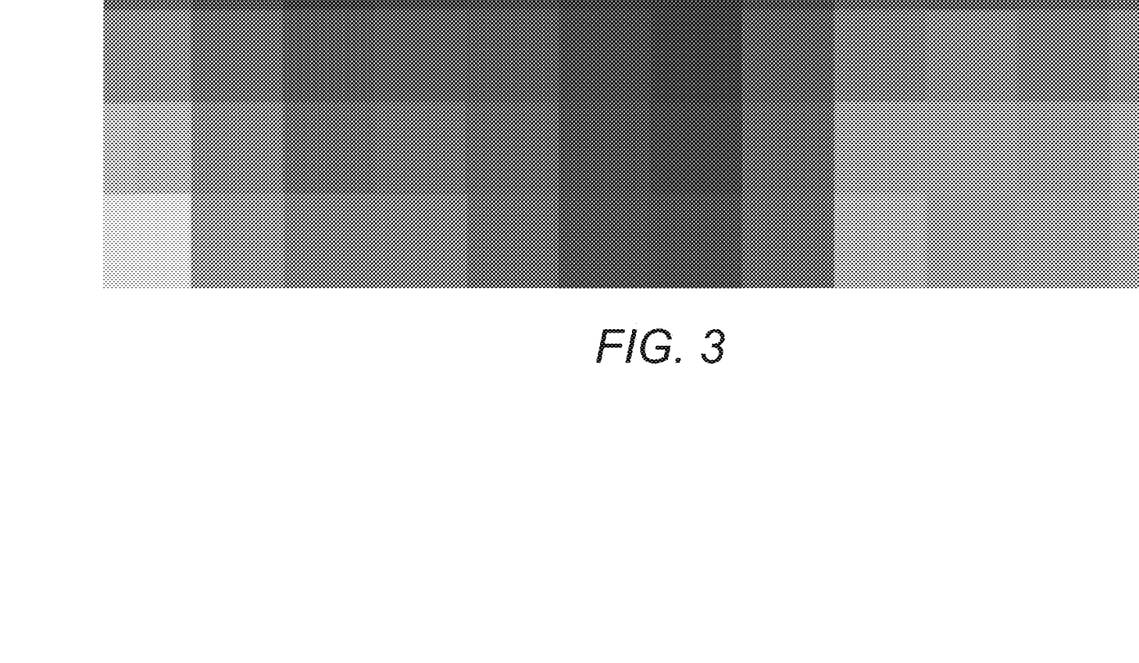
FIG. 3 is a target that is printed to evaluate overlay graininess.
Figure 4:
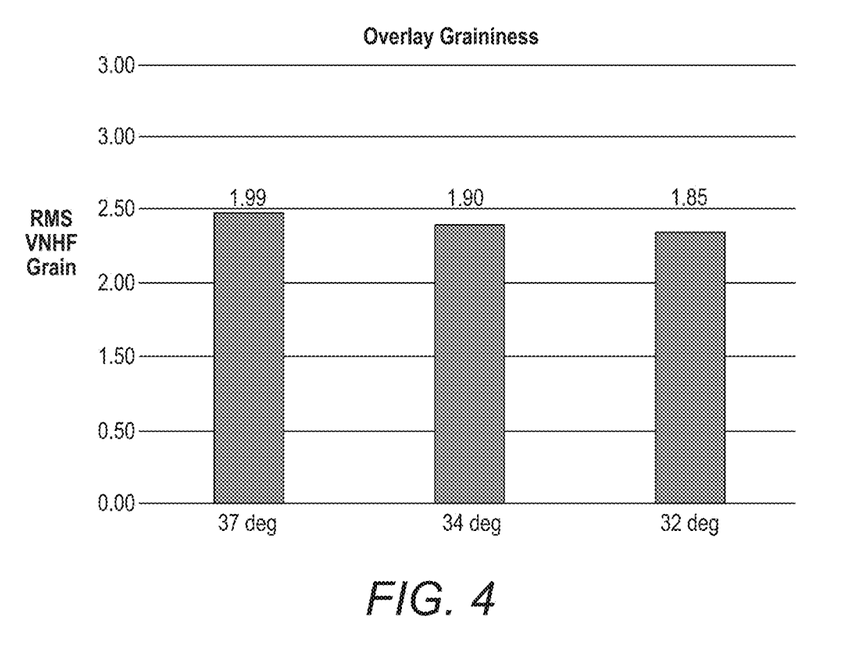
FIG. 4 is a graph that shows a measurement of overlay graininess obtained from the printing of the target in FIG. 3 for different printheads operated at different temperatures.
Figure 5:
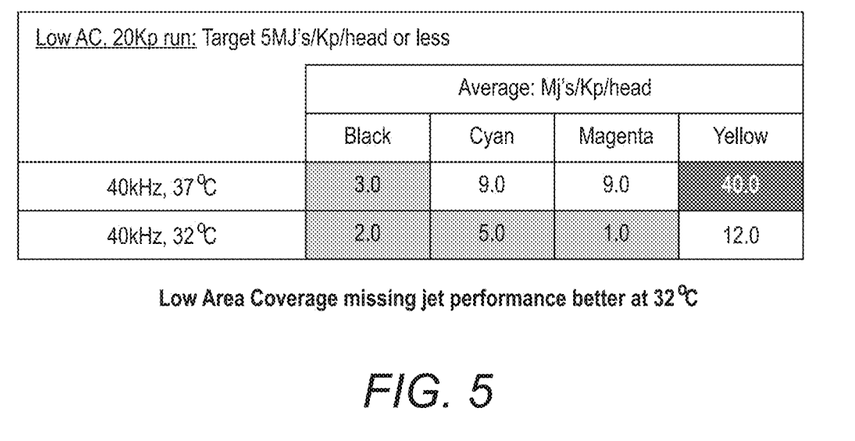
FIG. 5 is a table that indicates the inoperative inkjet rate for different colors of ink ejected from printheads operated at different temperatures.

One measurement of image quality is overlay graininess. Overlay graininess can be measured by printing the target of FIG. 3. Each square in the target is a combination of the CMYK colors having various degrees of spread ranging from 0-80% that produce the different hues in the target. Within one of these squares, a high frequency graininess measurement (VNHF) is made for a group of smaller squares, such as 1 inch×1 inch squares, and the root mean squared (RMS) value of these measurements is computed. This RMS measurement indicates the overlay graininess of a print. A RMS overlay graininess measurement of about 1.6 is considered good. The root cause for overlay graininess is a shear force acting on wet-on-wet ink drops. The shear force can smear or spread the drops, which causes graininess to occur. This graininess is further exacerbated when the ink drops are ejected onto non-absorbent media, such as offset coated glossy stocks. Printheads operating at a lower printhead temperature eject the ink drops at a lower temperature, which causes the ink drops to have a higher viscosity and, thus, are less susceptible to shear forces. Consequently, the ink drops retain their shape as they dry, which produces a proper pixel rather than spreading sufficiently to degrade the integrity of the pixel. The graph of FIG. 4 shows the relationship between overlay graininess and printhead temperature for a particular type of printhead. The graph shows the RMS overlay graininess measurement taken for a print with the printhead operating at a 37° C. setpoint, a 34° C. setpoint, and a 32° C. setpoint. The change in the RMS overlay graininess measurement with the printhead operating at a 37° C. setpoint and the printhead operating at a 32° C. setpoint is 0.15, which is humanly observable. An additional benefit of cooler printhead temperatures is improved robustness of ink stability. The table of FIG. 5 indicates that the number of inoperative inkjets for each ink color in low coverage areas under a variety of printing conditions is less at the lower printhead temperature of 32° C. than the number of inoperative inkjets for the colors when the printhead temperature is 37° C. As noted previously, however, maintaining printhead temperature when printing some types of media or print jobs, such as duplex print jobs that print heavy-weight stocks, is problematic because of their inability to dissipate heat readily. Thus, a feed forward system and method has been developed to address this issue.

The parameters affecting printhead temperature control involve both cooling mechanisms and heating mechanisms. The cooling mechanisms include the ambient air temperature since an internal heater of the printhead heats the printhead above the ambient air temperature. Additionally, simplex printing is a cooling mechanism because media sheets passing through the print zone during one-sided printing are at about room temperature. Other cooling mechanisms include the volume of ink ejected and the operation of the printhead cooler 98 and the media cooler 96. The heating mechanisms include duplex printing because the media absorbs heat during the drying of the first printed side and from printer components in the return path during return travel to the print zone, and the operation of the internal heater of the printheads. In order to maintain printhead temperature in a relatively narrow range, the heating and cooling mechanisms should be balanced. The conditions occurring during a print job can change the thermal load on the printheads. As used in this document, the terms "thermal load" and "net heat flow" mean the sum of the amount of heat that will be produced by the heating mechanisms of a print job and the amount of cooling that will be produced by the cooling mechanisms of the print job during execution of the print job.

The feed forward system and method are designed so the net heat flow is always zero or negative when the heaters in the printheads are not operated. The internal heaters in the printheads are controlled to counteract the variations caused by various external conditions and maintain effective zero heat flow to the printheads. Because the printhead has a significant thermal mass, an instantaneous net positive heat flow does not significantly raise the temperature of the printhead. In general, the thermal load on a printhead divided by the thermal mass of a printhead provides an estimate of the potential rate of change in printhead temperature. This identified rate of temperature change can be used to determine when a positive thermal load is likely to raise printhead temperature to a level that is potentially detrimental to image quality. In typical inkjet printers, the time period for an adverse printhead temperature rise takes tens of seconds to a few minutes Therefore, "thermal load" and "net heat flow" are evaluated in a time-averaged fashion with a time window of tens of seconds to a few minutes.

When the printhead operating temperatures are lowered from 37° C. to 32° C. to obtain the benefits noted earlier, the cooling capacity at the print zone is reduced and the heating capacity is increased. In some cases, such as an extended run of duplex printing of coated media, the net heat flow becomes positive and the operation of the heater inside the printhead cannot be sufficiently reduced to counteract the positive flow of heat to the printheads. Therefore, stress situations that result in positive heat flow to the printheads need to be predicted so (1) warnings can be displayed for the printer operator, (2) the conditions that lead to these stress situations can be altered to reduce the thermal load to an acceptable level, or (3) the printhead and media coolers can be activated to compensate for the heat flow to the printheads.

In the feed forward system and method described below, the thermal load on the printheads is identified by analyzing the print jobs in the print queue before they are released for execution by the printer. By analyzing the type of print job (simplex or duplex), the amount of ink coverage, the media type, the mix of print jobs in the queue, and the sequence of future printing jobs, the thermal load on the printheads can be predicted and optimized. The inputs to the system and method include environmental condition measurements, such as ambient air temperature, humidity, paper temperature and humidity, ink temperature, printhead temperature, the duty cycle of the printhead heater, the temperature of the dryer, the temperature of media returning to the print zone in a duplex printing, and the like. These environmental condition measurements are received by the controller from sensors within the printer. The duty cycle of the printhead heater can be used to calibrate various aspects of the thermal load model prior to the run time for a print job. The most important inputs of the thermal load model are the ink image content data and the print job parameters for the print jobs in the print job queue that will be performed in the near future along with the environmental condition measurements. Print job parameters that are significant to the thermal load on the printheads include: the type of print job (simplex or duplex), substrate weight, and substrate type (coated, uncoated). The ink image content data is analyzed to identify the ink usage (light, medium and heavy) and ink area coverage for each color separation of each image. The output of the system and method is a prediction of the thermal load on the printheads in the near future and that thermal load prediction is compared to the heating capacity available from the operation of the printhead heater.

Some examples are now discussed. For a simplex print job to be performed by a printer operating in an ambient environment having a temperature of 75° F. or less, the odds of a printhead absorbing a net heat flow sufficient to raise its temperature one degree or more is low because the ink ejected by the printhead is about the same temperature of the printhead so no significant amount of heat flows from a printed sheet to the printhead during its transit through the print zone. Since the temperature of the substrate and the air dragged along with the media as the media passes the printhead is lower than the printhead temperature, the simplex printing job will take heat away from the printhead so it is a negative thermal load on the printhead. In this net negative external thermal load situation, the heating power of the printhead internal heater is adjusted to compensate for the negative external thermal load and tries to maintain the printhead temperature within a narrow predetermined temperature range. As long as the media is not heated to a temperature above the printhead temperature or the dryer is not operated at a temperature significantly above the printhead temperature, no external heat sources are present to raise the thermal load on the printhead and increase its temperature one degree or more. When the print job becomes a duplex job, then the system and method determine the temperature of the media exiting the dryer and, using the heat dissipation rate of the media type identified by the print job parameters, the time required to return the heated media sheet to the print zone at the media speed through the duplex path, and the ambient temperature in the return media path, the system and method identify the temperature of the media as it reenters the print zone and any temperature changes that will occur during the printing that occurs during the second pass. If this identified temperature exceeds the printhead temperature, then the system and method use the heat absorption rate of the thermal mass of the printhead and the net positive heat flow from the media sheets to identify the time required for the printhead to absorb sufficient heat to raise its temperature at least one degree. This time can be measured in typical time units, such as seconds or minutes, or it can be measured as function of the number of sheets passing through the print zone for the printing of the second side. This identified time period is used to evaluate remedial actions and select an appropriate remedial action for prevention of the printhead temperature rise of one degree or more. As used in this document, the term "remedial action" means a control operation taken to reduce the predicted thermal load on printheads in a printer that is adequate to prevent a printhead temperature rise of one degree or more.

The remedial actions that can be taken are many. For one, if the identified time period is too short for the net positive heat flow to the printhead to be sufficiently reduced to prevent the temperature rise, a signal is generated to alert the operator that a hard shutdown will occur during execution of the print job. This warning signal is generated before the print job is started. Another action can be a message identifying how the operator can reduce the thermal load on the printhead so execution of the print job does not overly increase the temperature of the printhead. One example of thermal load reduction that can be performed by an operator is manipulation of the print job queue. As used in this document, the term "manipulation of a print job queue" means a rearrangement or intermingling of print jobs within a print job queue to reduce a potential thermal load on the printheads during execution of the print job. For example, manipulation of a print job queue includes executing a simplex job in the print job queue before a duplex job is executed to reduce the temperature within the print zone before the duplex print job is commenced. Another manipulation involves reducing the length of a long duplex job by stopping the duplex job before the printhead temperature exceeds the upper threshold of a temperature range, executing a simplex print job and diverting the output of the simplex job to a different output receptacle, and then resuming the duplex print job and directing the output of the duplex print job to the output receptacle in which the first portion of the duplex print job was directed. Other print job queue manipulations include mixing simplex and duplex print jobs to balance the thermal load on the printheads prior to performing any print jobs in the print job queue. This mixing of print jobs can be done by the operator or the printer controller can be configured to rearrange the print jobs in the print job queue automatically. In some embodiments, the controller of the printer is configured with programmed instructions that when executed cause the controller to perform one or more of these job queue manipulation operations.

The controller can also be configured to regulate the duty cycles of the internal printhead heaters to reduce the amount of heat the internal heater provides to the printhead. Another remedial action that can be performed by the controller is the alteration of a print job parameter such as speed of the media through the printer. For example, by reducing the speed of the media through the printer, the time for the return of the printed media in a duplex print job to the print zone can be increased so it is adequate for reducing the temperature of the returned printed sheets to a level that does not provide a net positive heat flow to the printheads. Such a remedial action can prevent a hard shutdown. Another remedial action that the controller 80 can be configured to take is to activate the printhead cooler 98 or the media cooler 96 or both coolers so they reach operational conditions for cooling the printheads, the media in the duplex path, or both before the printhead temperature begins to rise. This activation of one or both of the coolers can include identification of a set point for the printhead or media temperatures so a feedback mechanism in each of the coolers can operate the coolers in an appropriate range about the identified set point.

Figure 6:
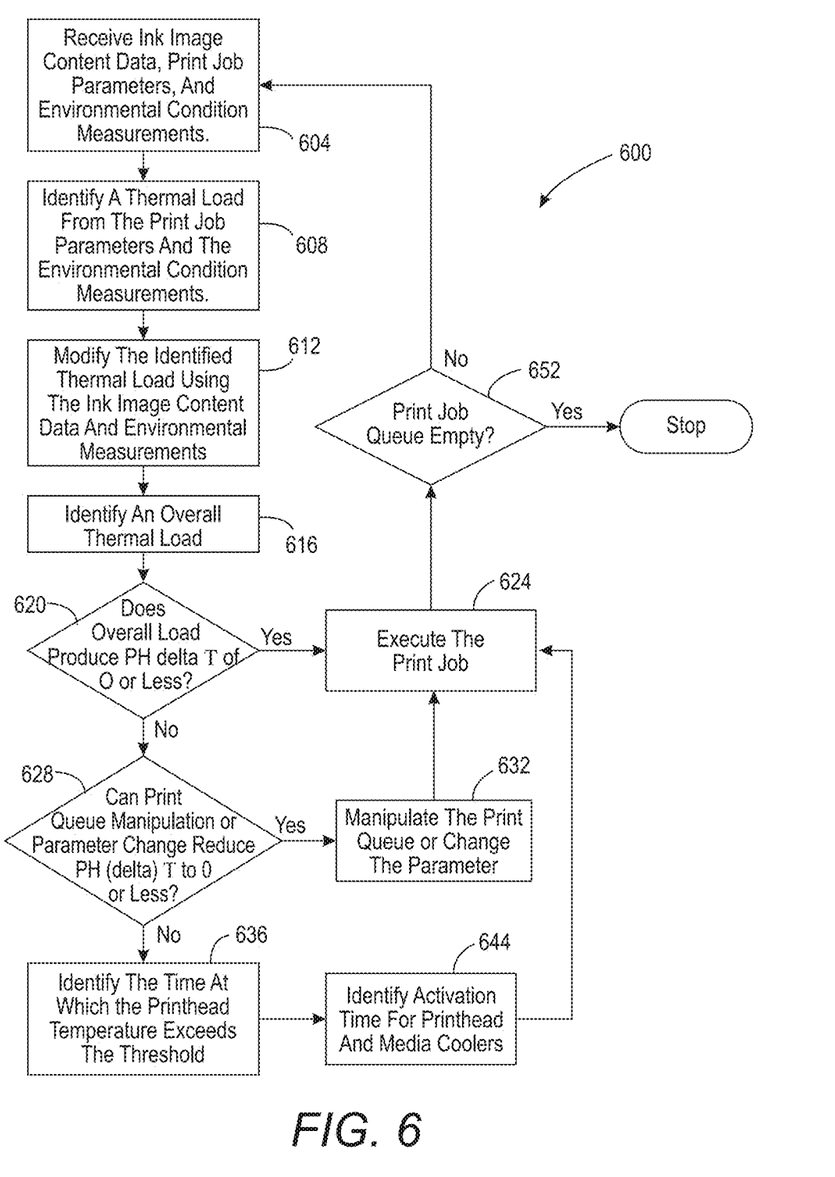
FIG. 6 is a flow diagram of a process for operating the printer of FIG. 1 to evaluate the thermal loads produced by executing a print job and to perform remedial actions when a predicted thermal load is likely to raise the temperature of a printhead above an upper threshold of a predetermined temperature range.

FIG. 6 depicts a flow diagram for a process 600 that analyzes ink image content data, print job parameters, and environmental condition measurements to identify the thermal load that the print job will place on the printheads and evaluate the remedial actions that can be taken to reduce the predicted thermal load on the printheads. The process 600 is described as being performed with the printer 10 of FIG. 1 for illustrative purposes.

The process 600 of operating the printer 10 begins with the reception of the image content data for the ink images to be printed in a print job, the print job parameters, and environmental condition measurements (block 604). The print job parameters and environmental measurements are analyzed to identify the thermal load the print job will place on the printheads (block 608). The ink image content data for the images in the print job and the environmental measurements are analyzed to identify the changes to the identified thermal load during the printing of the images (block 612) and the identified thermal load and the changes are combined to identify an overall thermal load on the printheads (616). If the overall thermal load on the printheads will not raise the temperature of any printhead above the upper threshold of a predetermined temperature range (block 620), then the print job is executed (block 624). If the overall thermal load causes the printhead temperature change to be above an upper threshold of the predetermined temperature range, then the print jobs in the print job queue are analyzed to determine whether print job queue manipulation or modification of print job parameters, such as print speed, can reduce the thermal load so the printhead temperature change is less than the upper threshold of the predetermined temperature range (block 628). If the thermal load can be reduced so the printhead temperature change remains below the upper threshold of the predetermined temperature range, then the print queue is manipulated or a print job parameter is modified (block 632) and the print job executed (block 624). If the thermal load cannot be reduced so the printhead temperature change remains below the upper threshold of the predetermined temperature range by print job queue manipulation or print job parameter alteration, then a time is identified at which the printheads begin to approach the upper threshold of the predetermined temperature range about the set point for the printheads (block 636). The identified time is used to determine an activation time for either the printhead cooler or the media cooler or both (block 644) and the print job is executed (block 624). When the print job is finished, the process recommences (block 604) unless the print job queue is empty (block 652). At that point, the process is finished.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
   at least one printhead; and
   a controller operatively connected to the at least one printhead and a print job queue, the controller being configured to:
      identify a thermal load on the at least one printhead that will occur during execution of a print job in the print job queue using print job parameters for the print job, ink image content data for the print job, and environmental condition measurements received from sensors in the printer;
      determine whether the identified thermal load will raise a temperature of the at least one printhead above an upper threshold of a predetermined temperature range;
      identify a remedial action that reduces the identified thermal load so execution of the print job will not raise the temperature of the at least one printhead above the upper threshold of the predetermined temperature range;
      perform the identified remedial action and the remedial action is a manipulation of the print job queue; and
      not identify a remedial action when the identified thermal load will not raise the temperature of the at least one printhead above an upper threshold of a predetermined temperature range.

2. The inkjet printer of claim 1, the controller being further configured to perform the manipulation of the print job queue by:
   executing a simplex print job in the print job queue before a duplex print job in the print job queue is executed to reduce a temperature within a print zone of the inkjet printer.

3. The inkjet printer of claim 1, the controller being further configured to perform the manipulation of the print job queue by:
   reducing a length of a duplex print job in the print job queue.

4. The inkjet printer of claim 3, the controller being further configured to reduce the length of the duplex job by:
   stopping the duplex print job before the temperature of the printhead exceeds the upper threshold of the temperature range;
   executing a simplex print job in the print job queue after the duplex print job is stopped; and
   resuming execution of the duplex print job after the execution of the simplex print job is finished.

5. The inkjet printer of claim 1, the controller being further configured to perform the manipulation of the print job queue by:
   arranging simplex and duplex print jobs in the print job queue to balance the thermal load on the at least one printhead.

6. The inkjet printer of claim 1, the controller being further configured to perform the remedial action by altering a print job parameter.

7. The inkjet printer of claim 6 wherein the altered print job parameter is media speed.

8. A method of operating an inkjet printer comprising:
   identifying a thermal load on at least one printhead prior to execution of a print job in a print job queue, the thermal load being identified by using print job parameters for the print job, ink image content data for the print job, and environmental condition measurements in the printer;
   determining whether the identified thermal load raises a temperature of the at least one printhead above an upper threshold of a predetermined temperature range; and
   identifying a remedial action that reduces the identified thermal load so the temperature of the at least one printhead will not be raised above the upper threshold of the predetermined temperature range when the print job is executed;
   performing the identified remedial action by manipulating the print job queue;
   not identifying a remedial action when the identified thermal load will not raise the temperature of the at least one printhead above the upper threshold of the predetermined temperature range.

9. The method of claim 8, the manipulation of the print job queue further comprising:
   executing a simplex print job in the print job queue before a duplex print job in the print job queue is executed to reduce a temperature within the print zone.

10. The method of claim 8, the manipulation of the print job queue further comprising:
    reducing a length of a duplex print job in the print job queue.

11. The method of claim 10, the reducing of the length of the duplex job further comprising:
    stopping the duplex print job before the temperature of the printhead exceeds the upper threshold of the temperature range;
    executing a simplex print job in the print job queue after the duplex print job is stopped; and
    resuming execution of the duplex print job after the execution of the simplex print job is finished.

12. The method of claim 8, the manipulation of the print job queue further comprising:
    arranging simplex and duplex print jobs in the print job queue to balance the thermal load on the at least one printhead.

13. The method of claim 8, the performing of the remedial action further comprising:
   altering a print job parameter.

14. The method of claim 13, the altering of the print job parameter further comprising:
   altering a media speed for media being printed during the execution of the print job.

* * * * *